United States Patent [19]

Kimmelman

[11] Patent Number: 5,072,210
[45] Date of Patent: Dec. 10, 1991

[54] COMBINATION TURN SIGNAL AND HAZARD WARNING FLASHER

[75] Inventor: Samuel Kimmelman, Jacksonville, Fla.

[73] Assignee: Epicor Industries, Inc., St. Augustine, Fla.

[21] Appl. No.: 536,027

[22] Filed: Jun. 11, 1990

[51] Int. Cl.⁵ .............................................. B60Q 11/00
[52] U.S. Cl. ..................................... 340/458; 340/471
[58] Field of Search ............... 340/458, 475, 471, 472; 315/77, 200 A

[56] References Cited

U.S. PATENT DOCUMENTS

| | | | |
|---|---|---|---|
| 3,763,469 | 10/1973 | Yonezu et al. | 340/458 |
| 3,824,542 | 7/1974 | Schorter . | |
| 3,858,177 | 12/1974 | Kugelmann et al. . | |
| 3,940,657 | 2/1976 | Kasiewicz et al. . | |
| 3,973,238 | 8/1976 | Kato et al. | 340/475 |
| 4,105,996 | 8/1978 | Shimizu | 340/458 |
| 4,173,013 | 10/1979 | Spiteri . | |
| 4,258,292 | 3/1981 | Kassfeldt . | |
| 4,504,820 | 3/1985 | Krumrein . | |

OTHER PUBLICATIONS

MOTOROLA, Motorola UAA1041 Silicon Monolithic Integrated Circuit, Internal block diagram and applications information (7-1986).
TELEFUNKEN, Telefunken U243B Monolithic Integrated Circuit, chip data sheets (date unknown).
CHRYSLER, Turn Signal/Hazard Warning System, with separation of functions and without cornering lamps-diagram (6-1988).

Primary Examiner—Jin F. Ng
Assistant Examiner—Brian R. Tumm
Attorney, Agent, or Firm—Allegretti & Witcoff, Ltd.

[57] ABSTRACT

An electronic turn signal and hazard warning flasher of the kind generally used in automobiles. The flasher is composed of a lamp outage sense resistor, a pulse generator, and an outage sense deactivation circuit which deactivates the lamp outage feature of the pulse generator. The lamp outage deactivation circuit, which receives feedback signals from the turn signal lamps, can be installed in a variety of flashers to deactivate the lamp outage feature, and also can take on a multiplicity of forms. In one form, the outage sense deactivation circuit consists of a resistor and a switch control in parallel between the sense resistor and the pulse generator. In another form, the circuit consists of first and second resistors and a switch control.

20 Claims, 4 Drawing Sheets

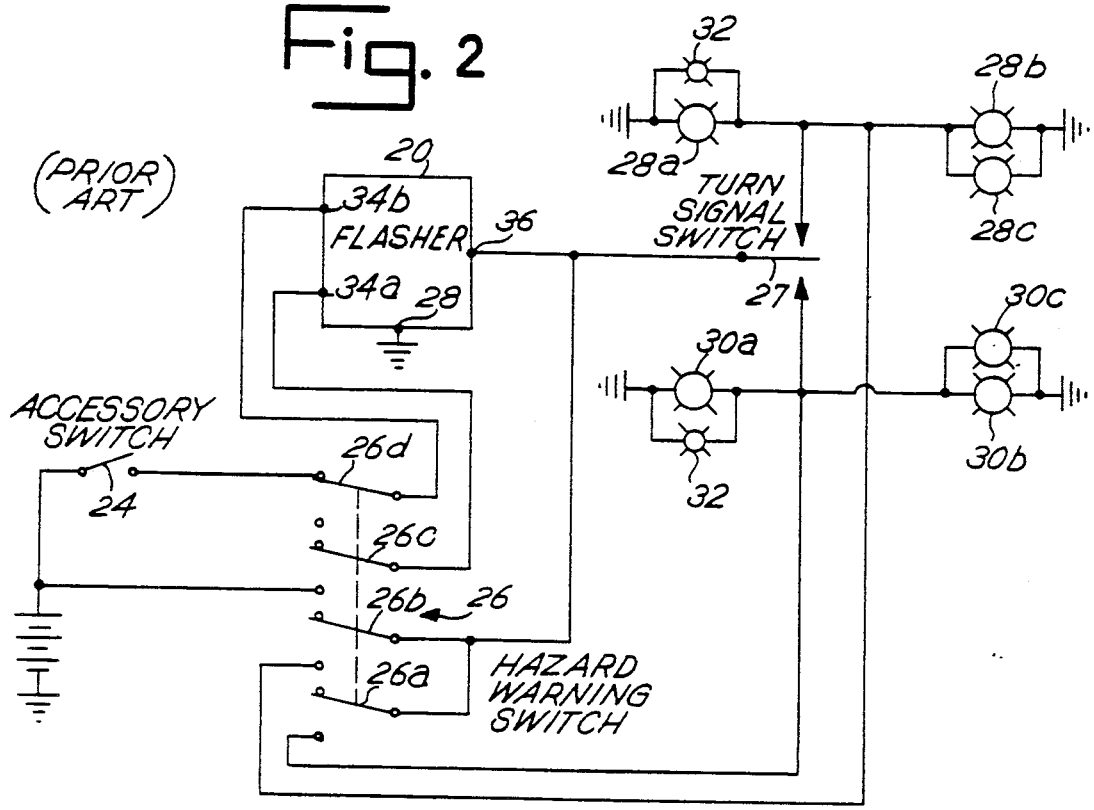
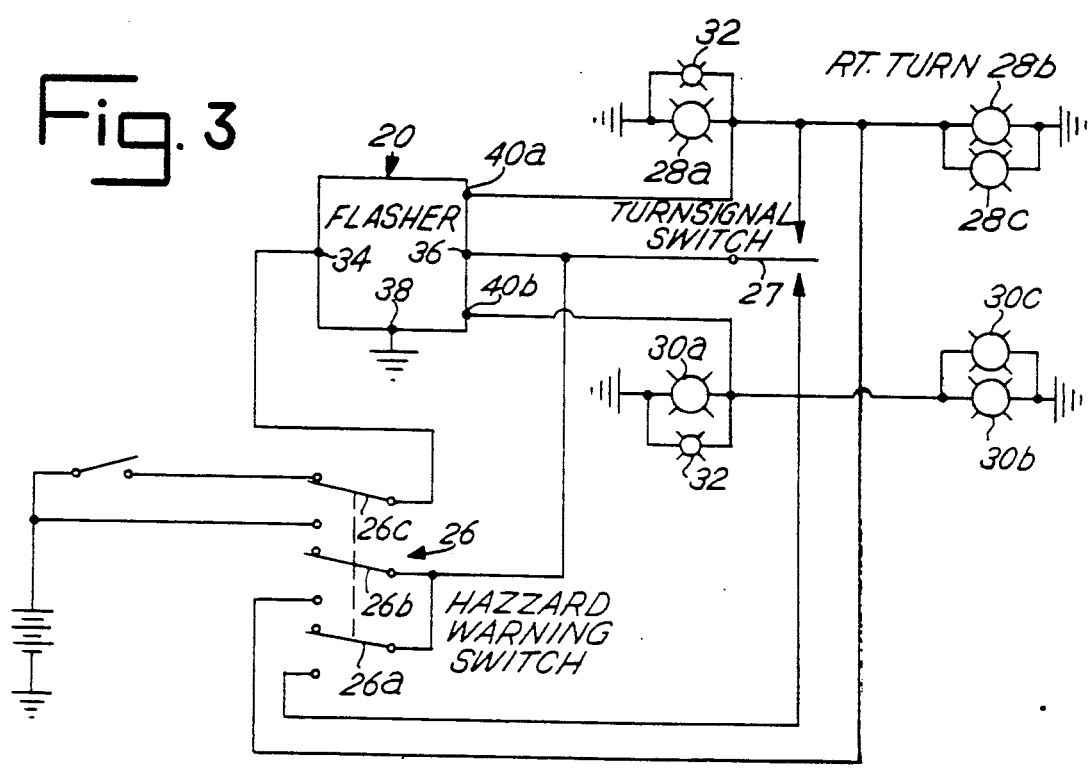

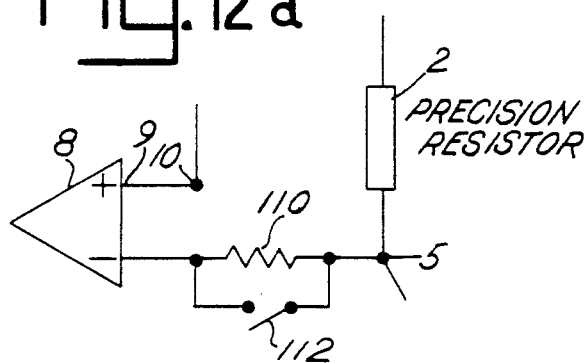
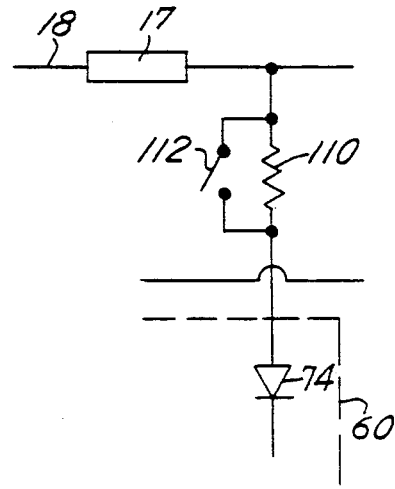
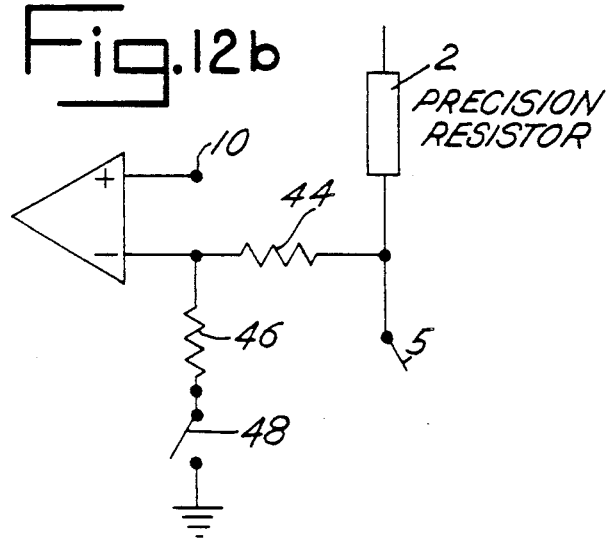
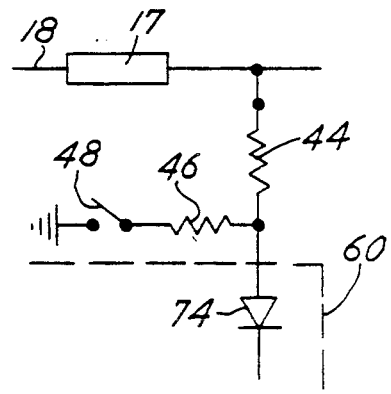
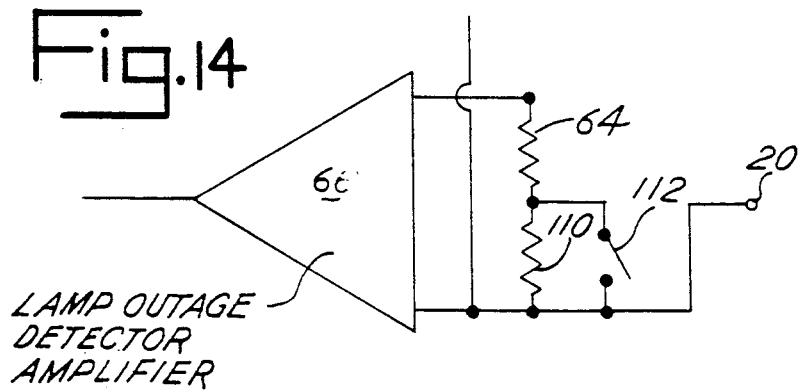

COMBINATION TURN SIGNAL AND HAZARD WARNING FLASHER

BACKGROUND OF THE INVENTION

1. Field of the Invention

This invention relates generally to electrical flashers and, in particular, flashers suitable for directional lights of a motor vehicle. More particularly, this invention relates to a combination turn signal-hazard warning flasher that allows for the use of a simple hazard warning switch in vehicles having three turn signal lamps per side for hazard warning operation.

2. Description of the Prior Art

Turn signal and hazard warning flashers are electronic devices that are used in cars to cause the turn signal lamps to blink on and off. Representative flasher units known in the art are those disclosed in U.S. Pat. No. 3,824,542, issued to Schorter, and U.S. Pat. No. 4,173,013, issued to Spiteri.

Flashers are also critical safety components of cars, used to indicate to other drivers whether a vehicle is turning, or disabled. The Federal Government has accordingly developed safety standards that flashers are required to meet. Since flashers are mass produced for millions of cars, a savings in cost and improvement in safety or performance such as provided in the present invention can result in a flasher that is of a distinct advantage to a manufacturer, and can save lives of motorists who use them.

The Federal motor vehicle safety standard (FMVSS) 108 requires all vehicles at the time of their manufacture to include a device for indicating to the driver a failure of one or more turn signal lamps in accordance with Society of Automotive Engineers (SAE) Standard J588e. An exception to this requirement exists for vehicles 80 or more inches in overall width, trucks that are capable of accommodating a slide-in camper, or vehicles equipped to tow trailers. With one or more lamps in "failure mode" (burned out, physically damaged or otherwise inoperative), SAE Standard J588e specifies that a lamp outage signal can be indicated by operating the lamps at a failure rate, for example, in "steady on", "steady off", or by a significant change in the flashing rate of the illuminated indicator. FMVSS-108 also requires that the vehicle hazard warning system continue to flash at the specified normal flash rate over lamp loads from 2 turn signal lamps to twice the turn signal lamp load.

Vehicles lamp systems can be classified as follows: 2 lamp turn signal systems have 1 front and 1 rear turn signal lamps on each side of the vehicle; 3 lamp turn signal systems have 1 front and 2 rear turn signal lamps on each side of the vehicle. For hazard warning, a 4 lamp hazard warning system has 2 front and 2 rear turn signal lamps that flash in hazard warning; a 6 lamp hazard warning system has 2 front and 4 rear turn signal lamps that flash in hazard warning. In vehicles having a 2 lamp turn signal system, and a 4 lamp hazard warning system, the use of a combination turn signal-hazard warning flasher requires no additional or special wiring, as the flasher input and output terminals are common to both systems. This flasher provides the specified flash rate over the lamp load range of 2 to 4 lamps, 2 lamp turn signal load and from 2 to 4 lamps hazard warning load, while providing means to indicate failure at 1 turn signal lamp.

A shortcoming of the prior art is that in vehicles having a 3 lamp turn signal system and a 6 lamp hazard warning system, a common practice is for the flasher to have an additional load carrying terminal, at either input or output of the flasher, and for the hazard warning switch to have an added set of switching contacts. These additions are required in order to change the internal operating characteristics of the flasher, thereby providing the means to indicate failure of one or more turn signal lamps, while providing the specified normal flash rate down to 2 lamps in hazard warning.

SUMMARY OF THE INVENTION

A combination electronic turn signal and hazard warning flasher for right and left turn signal lamps is herein described. The lamps are powered by a voltage source, such as a battery, and operated in normal mode at a normal rate and in failure mode at normal and failure rates. The flasher includes a sense resistor, a pulse generator and an outage sense deactivation circuit.

The sense resistor provides a status signal to indicate a turn signal lamp is in failure mode, and receives signals from the turn signal lamps. The outage sense deactivation circuit is connected to the blinking turn signal lamps. The outage sense deactivation circuit has a first condition and thereby provides a first signal to the pulse generator during turn signal operation, and has a second condition thereby provides a second signal to the pulse generator during hazard warning operation.

The pulse generator issues pulses to the turn signal lamps in response to the status signal and the first and second signals from the outage sense deactivation circuit. The pulse generator receives the first signal from the outage sense deactivation circuit and responsively issues flash pulses to the turn signal lamps at the normal rate in normal mode and at failure rate in failure mode during turn signal operation, and receives the second signal from the outage sense deactivation circuit and responsively issues flash pulses to the lamps at normal rate during hazard warning operation. In the preferred embodiment of the invention, the pulse generator is an automotive direction indicator integrated circuit chip with associated components. However, the present invention is adaptable to a variety of other pulsing generators. The outage sense deactivation circuit also can take a variety of forms.

An object of this invention is to produce an improved 3 lamp turn signal and 2 to 6 lamp hazard warning flasher, where the flasher has only one input and one output load carrying terminal, similar to that of a 2 lamp turn signal and 2 to 4-lamp hazard warning flasher; to provide means to indicate outage of one or more turn signal lamps; and to operate as specified over a hazard warning lamp load of 2 to 6 lamps.

A second object of this invention is to eliminate the need for an additional set of switch contacts within the hazard warning switch should one want to manufacture a vehicle having a 3 lamp turn signal system and a 2 to 6 lamp hazard warning system, thereby reducing the cost and complexity of a 3 lamp turn signal and 2 to 6 lamp hazard warning system.

A third object of this invention is to provide an on-off voltage to the flasher, in sequence with the on-off voltage across the selected direction turn signal lamps, that provides the means for the flasher flash rate to be controlled by the voltage drop across a sense resistor, thereby having the specified normal flash rate with a turn signal load of 3 lamps, and providing outage indication with outage of one or more turn signal lamps.

A fourth object of this invention is to provide an on-off voltage to the flasher, in sequence with the on-off voltage across the selected direction turn signal lamps, that provides the automotive direction indicator IC chip with the required flashing cycle reset voltage, but does not interfere with the operation of the sense resistor in its control of the flasher flash rate.

A fifth object of this invention is to provide two simultaneous on-off voltages to the combination flasher, one from each of the turn signal lamp systems, that provides an additional voltage to that developed across the sense resistor, that results in the flasher outage sense voltage never decreasing below the minimum required to maintain the specified flash rate, thereby providing the specified flash rate down to 2 lamps in hazard warning.

Changing the value of the outage sense resistor and the added resistors for hazard warning operation down to 2 lamps allows a combination flasher to be built for any number of turn signal lamps. Such a flasher will provide outage indication with failure of one or more turn signal lamps, while providing the specified normal flash rate down to 2 lamps in hazard warning.

These and other objects, features, and advantages of the present invention are discussed or apparent in the following detailed description.

BRIEF DESCRIPTION OF THE DRAWINGS

The invention will now be described in reference to the drawings, in which

FIG. 2 is a circuit diagram of a prior art 3 lamp turn signal and 2 to 6 lamp hazard warning system that uses a four terminal hazard warning switch and an extra load carrying input terminal to the flasher.

FIG. 3 is a circuit diagram of a preferred embodiment of a 3 lamp turn signal and 2 to 6 lamp hazard warning system.

FIGS. 12a and 12b are circuit diagrams of the outage sense deactivation circuit feature of the present invention shown in FIGS. 4 and 10 installed in the flasher unit of U.S. Pat. No. 4,504,820.

FIGS. 13a and 13b are circuit diagrams of the outage sense deactivation circuit feature of the present invention shown in FIGS. 4 and 10 installed in the flasher unit of U.S. Pat. No. 3,858,177.

FIG. 14 is a circuit diagram of the outage sense deactivation circuit feature of the present invention installed in the flasher unit of U.S. Pat. No. 4,258,292.

DETAILED DESCRIPTION OF THE PREFERRED EMBODIMENT OF THE INVENTION

Figures 1, 11:
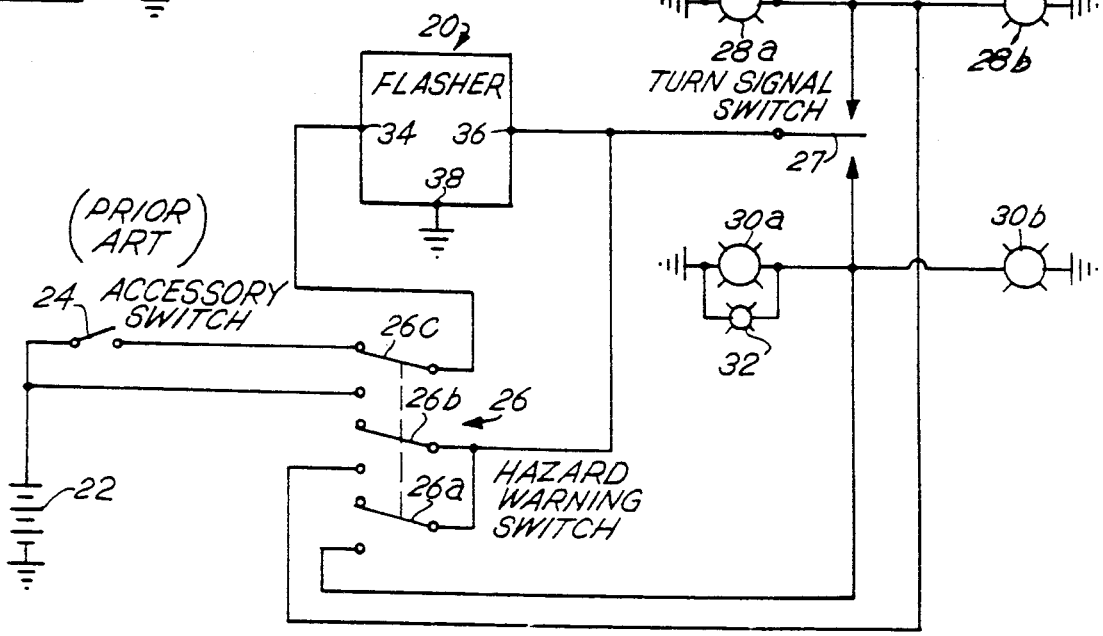
FIG. 1 is a circuit diagram of a prior art 2 lamp turn signal and 2 to 4 lamp hazard warning system using a three terminal hazard warning switch.
FIG. 11 is a circuit diagram of one form of the switch control means for the alternative embodiment of the present invention shown in FIG. 10.

FIG. 1 illustrates a prior art 2 lamp turn signal and 2 to 4 hazard warning system. The electronic turn signal-hazard warning flasher 20 is powered by voltage source 22, such as a car battery, either when the accessory switch 24 is closed or when the hazard warning switch 26 is closed. The hazard warning switch 26 is shown in FIG. 1 as being the standard, low cost 3 terminal hazard warning switch. The hazard warning switch 26 has contacts 26a, 26b and 26c. When the hazard warning switch 26 is open, as shown in FIG. 1, and accessory switch 24 is closed, flasher 20 sends pulses to right turn signal lamps 28a and 28b or to left turn signal lamps 30a and 30b depending on whether the driver closes turn signal switch 27 to indicate a left turn or a right turn. If the driver should close the hazard warning switch 26, the flasher 20 sends flash pulses to both sets of right and left turn signal lamps 28a and 28b and 30a and 30b. When the right turn signal lamps are operated, the indicator 32 lights, indicating to the driver that his turn signal lamps are operating.

The flasher 20 is shown as having a single voltage source terminal 34, and a single load terminal 36. The flasher 20 is grounded at terminal 38.

FIG. 2 illustrates a prior art 3 lamp turn signal and 2 to 6 lamp hazard warning system that is in common practice today. The operation of this system is the same as in FIG. 1. This system has additional turn signal lamps 28c and 30c. One disadvantage of this system is that the hazard warning switch 26 has an additional contact 26d and flasher 20 has two voltage source terminals 34a and 34b, whereas the flasher of FIG. 1 has only a single voltage source terminal 34.

Figure 5:
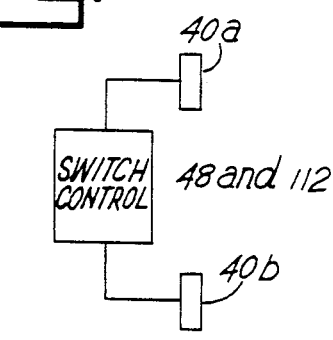
FIG. 5 is a diagram of the switch control shown in the circuit of FIG. 4.

The system that incorporates the present invention is shown in FIG. 3. The hazard warning switch 26 is the three contact hazard warning switch of FIG. 1. The flasher 20 has a single voltage source terminal 34 and a single load terminal 36. The flasher 20 receives feedback signals from the right and left turn signal lamps at the terminals 40a and 40b. As is shown in FIG. 5, these signals are received by a switch control means incorporated into the flasher 20.

Figure 4:
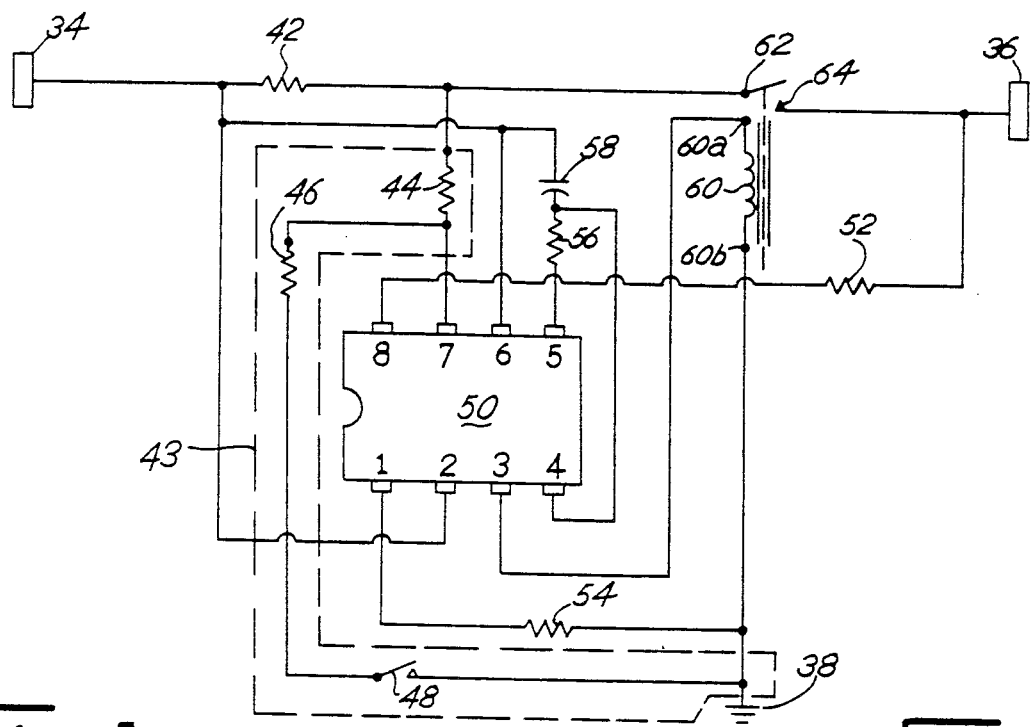
FIG. 4 is a circuit diagram of the electronic turn signal hazard warning flasher shown in FIG. 3.

The flasher 20 in FIG. 3 is shown according to the present invention in circuit diagram form in FIG. 4. The flasher 20 shown in FIG. 4, in the general sense, can be said to comprise three discrete component parts that cooperatively interact to produce flash pulses to the turn signal lamps. These parts are a pulse generator 41 that issues pulses to the lamps at normal and failure rates, a sense resistor 42 that detects an outage of a lamp and provides a lamp status signal to the pulse generator chip 50 and associated parts, and on outage sense deactivation circuit 43 that deactivates the lamp outage status signal when the turn signals are operated in hazard warning mode. The outage sense deactivation circuit 43, shown in dashed lines and comprises a first resistor 44, second resistor 46, and switch control 48. The pulse generator 41 is comprised of automotive direction indicator integrated circuit chip 50 and additional components shown that cause it to operate as a flasher.

The pulse means shown in FIG. 4 comprises an automotive direction indicator integrated circuit (IC) chip 50 and the associated components shown. In the preferred embodiment, the chip 50 includes pins 1, 2, 3, 4, 5, 6, 7, and 8. For example, the Motorola UAA1041 Automotive Direction Indicator chip is suitable for the chip 50, but the Telefunken U243B Monolithic Integrated Circuit chip is interchangeable with the Motorola UAA1041 chip.

The pulsing means is designed to operate when chip 50 senses a load through a resistor 52 at pin 8. The chip 50 has a resistor 54 between pin 1 and ground 38, and pin 5 is connected to the voltage terminal 34 through a resistor 56 and a capacitor 58. The resistor 56 and capacitor 58 cooperate with the oscillator feature of the chip to determine the flash rate of the chip. Pin 4 is connected to the common terminal of the resistor 56 and the capacitor 58. The chip 50 also receives a voltage signal from the voltage terminal 34 at pin 2 and pin 6. The relay 60 having normally open contacts has a first terminal 60a connected to pin 3 and a second terminal 60b connected to ground 38. The pulse means causes the turn signal lamps to flash "on" and "off" by issuing pulses from closing and opening of the contacts 62 and 64 of the relay 60.

As mentioned above, the flasher 20 has a sense resistor 42. The sense resistor 42 provides a status signal to the pulsing means to indicate a lamp has failed when the contacts 62 and 64 are closed and a light bulb is defective. The chip 50 receives the status signal through sense resistor 42 and, when the system is in failure mode, the the chip 50 doubles the flashing frequently during turn signal operation.

Flasher 20 has an outage sense deactivation circuit 43 (dashed lines), shown in FIG. 4 as comprising a 470 ohm resistor 44 between the sense resistor means 42 and the chip 50, and 24K ohm resistor 46 and a switch control means 48 in series between resistor 46 and ground 38. The actual value of resistors 44 and 46 is not as important as their relative ratios. The flasher 20 is operative without the outage sense deactivation circuit feature of the present invention by connecting the sense resistor 42 directly to pin 7 of chip 50 without resistor 44.

As shown in FIG. 5, the switch control means 48 of the outage sense deactivation circuit 43 receives feedback signals from the right and left turn signal lamps at terminals 40a and 40b. The outage sense deactivation circuit 43 is in a first condition when the switch control 48 is in an open position, thereby providing a first signal to the pulsing means, and a second condition when the switch control 48 is in a closed position, thereby providing a second signal to the pulsing means. For the outage sense deactivation circuit 43 shown in FIG. 4, the switch control means is closed in hazard warning operation and open in right or left turn signal operation. During turn signal operation, with the switch control 48 open, the voltage drop across resistor 44 is insufficient to effect the reset function of the chip 50. The chip 50 thus receives the status signal from the sense resistor 42, and issues pulses to the turn signal lamps at normal rate when the system is in normal mode and at failure rate during failure mode.

During hazard warning operation, the switch control 48 is closed when both right and left turn signal lamps are "on", and open when the right and left turn signal lamps are "off". Thus, the switch control 48 operates in sequence with the lamps. When the switch control 48 is open, lamps "off", the voltage drop across resistor 44 is insufficient to effect the resetting function of chip 50. When the switch control 48 is closed, lamps "on", the current through resistors 44 and 46 develops a voltage drop across the resistor 44 that allows the chip 50 to continue to operate at the normal flash rate with lamp failures decreasing the status signal from the sense resistor 42.

Figure 6:
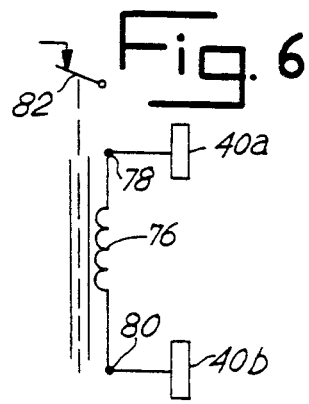
FIG. 6 is a circuit diagram of one form of the switch control means shown in FIG. 4 and FIG. 5.
Figure 7:
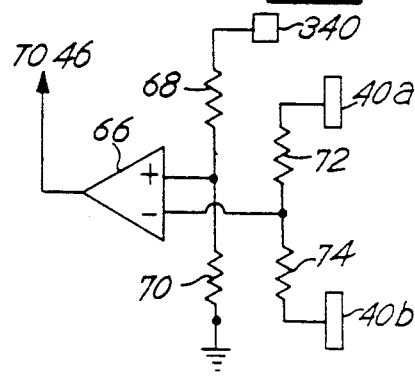
FIG. 7 is a circuit diagram of an alternative form of the switch control means shown in FIG. 4 and FIG. 5.

Having described the purpose and objective of the switch control means 48, FIGS. 6, 7, 8 and 9 each show alternative switch control for achieving the above objective. In the preferred embodiment of the invention, FIG. 7 shows a switch control comprising an operational amplifier 66 whose output is connected to pin 7 of the chip 50 through the resistor 46. A voltage divider consisting of resistors 68 and 70 between the voltage source terminal 34 and ground 38 are provided, as are resistors 72 and 74, which receive feedback signals from the turn signal lamps at terminals 40a and 40b, respectively. The negative input to amplifier 66 receives a signal from the common terminal of resistors 72 and 74, and the positive input of the amplifier 66 receives a signal from the common terminal of resistors 68 and 70. Resistors 68, 70, 72 and 74 are chosen such that the resistance values of 72 and 74 are equal, resistor 68 has a resistance value one half that of resistors 72 and 74, and resistor 70 has a resistance value 3/2 times that of resistors 72 and 74. In hazard warning operation and in turn signal operation, the switch control of FIG. 7 performs the functions as explained above.

Referring now to FIG. 6, the switch control 48 comprises a relay 76 having a first terminal 78 receiving feedback signals from the right turn signal lamps at 40a and a second terminal 80 receiving feedback signals from the left turn signal lamps at 40b. The relay 76 has a normally closed contact 82 between the resistor 46 and ground 38. During turn signal operation, right or left lamps "on", the relay 76 is energized with the non-operating turn signal lamps providing a ground return, and switch contact 82 opens. During hazard warning operation, both right and left lamps are "on" simultaneously, the relay 76 is not energized and remains in a closed position. The switch control of FIG. 6 thus performs the functions as explained above.

Figure 8:
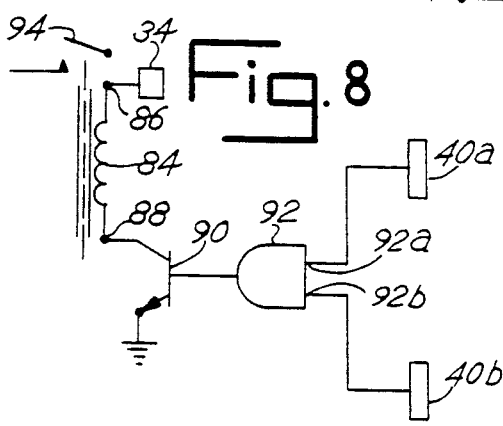
FIG. 8 is a circuit diagram of a second alternative form of the switch control means shown in FIG. 4 and FIG. 5.

Referring now to FIG. 8, the switch control 48 comprises a relay 84 having a normally open contact 94. The relay 84 has a first terminal 86 receiving a signal from the voltage source 34, and a second terminal 88 receiving a signal from the collector of transistor 90. The emitter of transistor 90 is grounded, the base of the transistor 90 receiving a signal from a logic device, shown in FIG. 8 as an AND gate 92. AND gate 92 has a first input 92b receiving a feedback signal from right turn signal lamps at 40a and a second input 92a receiving a feedback signal from the left turn signal lamps at 40b. During hazard warning operation, the contact 94 is in a closed position during lights "on", and during turn signal operation, the contact 94 is in an open position. Thus, the switch control shown in FIG. 8 also performs the functions as described above.

Figure 9:
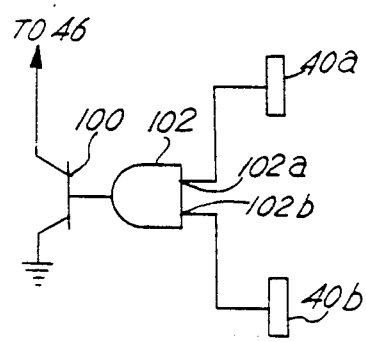
FIG. 9 is a circuit diagram of a third alternative form of the switch control means shown in FIG. 4 and FIG. 5.

Referring now to FIG. 9, the switch control 48 is shown as comprising a transistor 100, whose collector sends a signal to resistor 46. The emitter of transistor 100 is grounded. The base of the transistor 100 receives a signal from the output of a logic device shown in FIG. 9 as an AND gate 102. The AND gate 102 has inputs 102a and 102b which receive feedback signals from the right and left turn signals at 40a and 40b, respectively.

During hazard warning operation, the switch control 48 of FIG. 9 is in a "closed" state and operates in sequence with the turn signal lamps. During turn signal operation, switch control 48 of FIG. 9 is in an "open" state. Thus, the switch control of FIG. 9 performs like the other switch control of FIGS. 6, 7, and 8 in the flasher circuit of FIG. 4.

Figure 10:
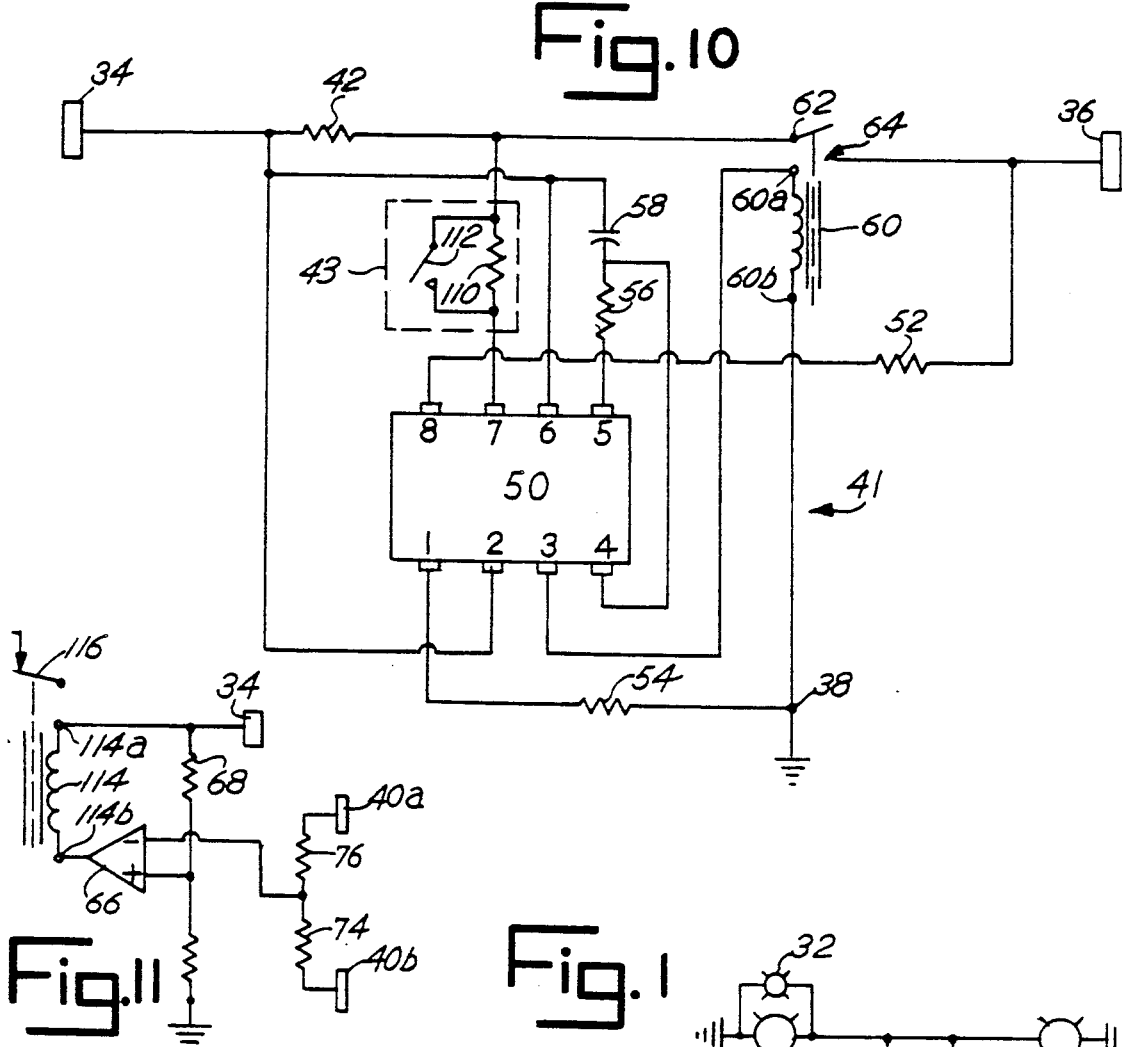
FIG. 10 is a circuit diagram of an alternative embodiment of electronic turn signal hazard warning flasher shown in FIG. 3 according to the present invention.

Referring now to FIG. 10, an alternative embodiment of the flasher 20 according to the present invention is shown in circuit diagram form. This embodiment contains the same elements of the sense resistor 42, an outage sense deactivation circuit 43 (dashed lines) and pulse generator 41 based on the chip 50 as the embodiment of the invention as shown in FIG. 4. The difference between the embodiment of FIG. 10 and the embodiment of FIG. 4 is that the outage sense deactivation circuit 43 comprises a 39K ohm resistor 110 and a switch control 112 connected in parallel between the sense resistor 42 and pin 7 of the chip 50 of the pulse generator 41. The switch control 112 receives feedback signals from the right and left turn signal lamps as shown in FIG. 5. The pulsing generator and operation of chip 50 is the same as the embodiment shown in FIG. 4; only the outage sense deactivation circuit 43 is different between the embodiment of FIGS. 4 and 10.

The function of the outage sense deactivation circuit 43 is now described. See FIG. 10. During turn signal operation, the outage sense deactivation circuit is in a closed condition every cycle of the turn signal lamps and thereby providing a first signal to the chip 50 of the pulse generator 41 by shorting resistor 110. When relay 60 is open, the voltage at pin 7 allows chip 50 to reset. When the relay 60 is closed, and the outage sense deactivation circuit 43 is closed, the resistor 110 is shorted and the status signal to the pulse generator 41 allows the load amount from the voltage drop across sense resistor 42 to control the pulse rate.

During hazard warning operation, the switch control 112 is in an open position causing the outage sense deactivation circuit 43 to be in an open condition, thereby providing a second signal to the chip 50 through the resistor 110, which is not shorted. The voltage drop between pins 2 and 6 and pin 7 of the chip 50 is determined by the load current through the sense resistor 42 plus the voltage drop across the resistor 110. Should the voltage drop across the sense resistor 42 decrease below that of turn signal operation due to lamp failure, the voltage drop across the resistor 110 is sufficient to compensate for the drop in voltage across the sense resistor 42, thereby allowing the chip 50 to continue to issue pulses at normal rate during hazard warning regardless of whether the lamps are in failure mode or in normal mode.

As was the case with the embodiment shown in FIG. 4, the embodiment of the invention in FIG. 10 incorporates several possible alternative choices for the switch control 112, the criteria being that the switch control 112 is to be in a closed state during turn signal operation and in an open state during hazard warning. The switch control of FIG. 6 is suitable with the modification that the relay 76 would have a normally open contact rather than the normally closed contact 82 as shown in FIG. 6. The switch control of FIG. 8 is suitable with the modification that the relay 84 has a normally closed contact instead of the normally open contact 94 shown in FIG. 8. The switch control of FIG. 11 is also suitable. Note that FIG. 11 is the switch control of FIG. 7 with the addition of a relay 114 having a first terminal 114a receiving a signal from the voltage source terminal 38 and a second terminal 114b receiving a signal from the output of operational amplifier 66. The relay 114 has a normally closed contact 116 such that in turn signal operation, the switch control of FIG. 11 is in a closed state and during hazard warning operation, is in an open state.

The outage sense deactivation circuit shown in FIGS. 4 and 10 can be installed in other electronic flashers comprising a sense resistance device and a pulsing means for issuing pulses, and the present invention should be construed to encompass such designs. The flashers shown in FIGS. 4 and 10 are based on the automotive direction indicator integrated circuit chip, but flashers based on other circuitry are known in the art and can be adapted to include the outage sense deactivation circuit feature.

For example, it will be apparent to those of ordinary skill in the art from FIG. 12a that the flasher unit disclosed in U.S. Pat. No. 4,504,820, issued to Krumrein, can be adapted to deactivate the failure flash rate when the flasher is operated in hazard warning and the lamp load has decreased below that specified for turn signal operation. This is achieved by the addition of a switch control 112 and the associated resistor 110 so that the resistor 110 is connected between the precision resistor and the "negative" terminal of the comparator of the Krumrein flasher unit. Referring to FIG. 12b, in the alternative, the addition of the switch control 48 and the two associated resistors 46 and 44 into the Krumrein flasher unit such that resistor 44 is connected between the precision resistor and the "negative" terminal of the comparator, with resistor 46 connecting to ground through switch control 48, will produce the same result.

As an additional example, and referring to FIG. 13a, the pulse generator of U.S. Pat. No. 3,858,177, issued to Kugelman et al., can be adapted to provide similar deactivation of the lamp outage feature in hazard warning operation. This is achieved by the addition of the switch control 112 and associated resistor 110 between the resistor 17 and diode 74 of the pulse generator of the Kugelman patent. Alternatively, referring now to FIG. 13b, the addition of resistors 44 and 46 and switch control 48 with resistor 44 connected between resistor 17 and diode 74 of the Kugelman pulse generator will produce the same result.

As yet another example, the flasher device of U.S. Pat. No. 4,258,292, issued to Kassfeldt, can be adapted to provide similar deactivation of the lamp outage feature in hazard warning operation. Referring to FIG. 14, this is achieved by the addition of resistor 110 in parallel with switch control 112 located in series with resistor 64, with the series circuit positioned across the inputs of lamp outage detector amplifier 66.

A preferred and an alternative embodiment of the present invention has been described. It is to be understood, however, that changes and modifications can be made without departing from the true spirit and scope of the present invention which are defined by the following claims and their equivalents, to be interpreted in light of the foregoing specification.

What is claimed is:

1. An electronic turn signal and hazard warning flasher for right and left turn signal lamps, said lamps powered by a voltage source and operated in normal mode at a normal rate and in failure modes at normal and failure rates, comprising, in combination:

(a) sense resistor means for providing a status signal to indicate a lamp is in failure mode, said sense resistor means receiving signals from said lamps;
(b) an outage sense deactivation circuit receiving feedback signals from said turn signal lamps having a first condition and thereby providing a first signal during turn signal operation and having a second condition and thereby providing a second signal during hazard warning operation; and
(c) pulsing means for issuing pulses to said lamps in response to said status signal and said first and second signals,
said pulsing means receiving said first signal from said outage sense deactivation circuit and responsively issuing flash pulses to said turn signal lamps at said normal rate in said normal mode and at said failure rate in said failure mode during turn signal operation, and
said pulsing means receiving said second signal from said outage sense deactivation circuit and responsively issuing flash pulses to said lamps at said normal rate during hazard warning operation.

2. The flasher of claim 1 wherein said outage sense deactivation circuit comprises, in parallel, a resistor and a switch control, said outage sense deactivation circuit being in said first condition when said switch control is in a closed state during turn signal operation and said outage sense deactivation being in said second condition when said switch control is in an open state during hazard warning operation.

3. The flasher of claim 1 wherein said outage sense deactivation circuit comprises a first resistor, a second resistor, and a switch control between said second resistor and ground, said outage sense deactivation circuit being in said first condition when said switch control is in an open state during turn signal operation and said outage sense deactivation circuit being in said second condition when said switch control is in a closed state during hazard warning operation.

4. The flasher of claim 2 or claim 3 wherein said switch control comprises a relay having a first terminal receiving the feedback signals from said right turn signal lamps and a second terminal receiving the feedback signals from said left turn signal lamps.

5. The flasher of claim 2 wherein said switch control comprises:
a relay having first and second terminals, said first terminal receiving a signal from said voltage source;
a voltage divider comprising first and second resistors between said voltage source and ground; and
an operational amplifier having first and second inputs and an output, said output sending the feedback signals to said second terminal of said relay, said first input receiving and said second input receiving the feedback signals from said turn signal lamps.

6. The flasher of claim 3 wherein said switch control comprises:
a voltage divider comprising a third resistor and a fourth resistor between said voltage source and ground; and
an operational amplifier having first and second inputs and an output, said output sending the feedback signals to said second resistor, said first input receiving a signal from said voltage divider and said second input receiving the feedback signals from said turn signal lamps.

7. The flasher of claim 2 or claim 3 wherein said switch control comprises
a relay having a first terminal and a second terminal, said first terminal receiving a signal from said voltage source;
a transistor having a base, a collector and an emitter, said collector sending a signal to said second terminal of said relay, said emitter operatively connected to ground; and
a logic device having a first input and a second input and an output, said first input receiving the feedback signals from said right turn signal lamps and said second input receiving the feedback signals from said left turn signal lamps, said output of said logic device sending a signal to said base of said transistor.

8. The flasher of claim 3 wherein said switch control comprises:
a transistor having a base, a collector, and an emitter, said collector sending a signal to said second resistor, said emitter operatively connected to ground; and
a logic device having a first input, a second input and an output, said first input receiving the feedback signals from said right turn signal lamps and said second input receiving the feedback signals from said left turn signal lamps, said output of said logic device sending a signal to said base of said transistor.

9. The flasher of claim 7 wherein said logic device comprises an AND gate.

10. The flasher of claim 8 wherein said logic device comprises an AND gate.

11. The flasher of claim 1 wherein said pulsing means comprises:
an automotive direction indicator integrated circuit chip receiving a signal from said voltage source, the feedback signals from said lamps and issuing said pulses to said lamps;
a relay having a first terminal and a second terminal, said first terminal receiving a signal from said automotive indicator chip and said second terminal operatively connected to ground, said relay opening and closing a contact in response to signals from said automotive indicator chip;
a first resistance means through which said automotive indicator chip receives said signal from said lamp;
a second resistance means through which said automotive indicator chip is operatively connected to ground; and
a third resistance means and a capacitance means which cooperate with said automotive indicator chip to issue said pulses.

12. The flasher of claim 11 wherein said outage sense deactivation circuit comprises, in parallel, a resistor and a switch control, said outage sense deactivation circuit being in said first condition when said switch control means is in a closed state during turn signal operation and said outage sense deactivation being in said second condition when said switch control is in an open state during hazard warning operation.

13. The flasher of claim 11 wherein said outage sense deactivation circuit comprises a first resistor, a second resistor and a switch control between said second resistor and ground, said outage sense deactivation circuit being in said first condition when said switch control is in an open state during turn signal operation and said outage sense deactivation circuit being in said second condition when said switch control is in a closed state during hazard warning operation.

14. The flasher of claim 12 or claim 13 wherein said switch control comprises a relay having a first terminal receiving the feedback signals from said right turn signal lamps and a second terminal receiving the feedback signals from said left turn signal lamps.

15. The flasher of claim 12 wherein said switch control comprises:
   a relay having first and second terminals, said first terminal receiving a signal from said voltage source;
   a voltage divider comprising first and second resistors between said voltage source and ground; and
   an operational amplifier having first and second inputs and an output, said output sending a signal to said second terminal of said relay, said first input receiving and said second input receiving the feedback signals from said turn signal lamps.

16. The flasher of claim 13 wherein said switch control means comprises:
   a voltage divider comprising a third resistor and a fourth resistor between said voltage source and ground; and
   an operational amplifier having first and second inputs and an output, said output sending a signal to said second resistance means, said first input receiving a signal from said voltage divider and said second input receiving the feedback signal from said turn signal lamps.

17. The flasher of claim 12 or claim 13 wherein said switch control comprises:
   a relay having a first terminal and a second terminal, said first terminal receiving a signal from said voltage source;
   a transistor having a base, a collector and an emitter, said collector sending a signal to said second terminal of said relay, said emitter operatively connected to ground; and
   a logic device having a first input and a second input and an output, said first input receiving the feedback signal from said right turn signal lamps and said second input receiving the feedback signal from said left turn signal lamps, said output of said logic device sending a signal to said base of said transistor.

18. The flasher of claim 13 wherein said switch control comprises:
   a transistor having a base, a collector, and an emitter, said collector sending a signal to said second resistor, said emitter operatively connected to ground; and
   a logic device having a first input, a second input and an output, said first input receiving the feedback signal from said right turn signal lamps and said second input receiving the feedback signal from said left turn signal lamps, said output of said logic device sending a signal to said base of said transistor.

19. The flasher of claim 17 wherein said logic device comprises an AND gate.

20. The flasher of claim 18 wherein said logic device comprises an AND gate.

* * * * *

UNITED STATES PATENT AND TRADEMARK OFFICE
CERTIFICATE OF CORRECTION

PATENT NO. : 5,072,210

DATED : December 10, 1991

INVENTOR(S) : Samuel Kimmelman, of United States of America

It is certified that error appears in the above-identified patent and that said Letters Patent is hereby corrected as shown below:

In the Drawings:

In FIG. 4 of the drawings, a reference numeral 41 and arrow should be placed to the right of the IC chip 50 pointing in the general direction of the IC chip 50 and its associated circuitry in the same manner as the reference numeral 41 in FIG. 10.

At column 2, line 37, add --the-- before "failure rate".

At column 4, line 60, replace "on" with --an--; at line 64, delete "and".

At column 5, line 32, replace "frequently" with --frequency--.

At column 6, line 11, replace "control" with --controls--; at line 51, replace "receiving" with --receives--.

At column 7, line 30, replace "providing" with --provides--.

Signed and Sealed this

Thirtieth Day of March, 1993

*Attest:*

STEPHEN G. KUNIN

*Attesting Officer*       *Acting Commissioner of Patents and Trademarks*